United States Patent Office 3,430,901
Patented Mar. 4, 1969

3,430,901
MOUNTING DEVICE FOR THE ENGINE BLOCK
OF A VEHICLE
André Cauvin, 33 Rte. de Versailles, Port Marly,
Yvelines, France
Filed July 20, 1967, Ser. No. 654,766
U.S. Cl. 248—8                                    3 Claims
Int. Cl. F16f 15/08; F16m 5/00, 1/00

ABSTRACT OF THE DISCLOSURE

A mounting device to be used with a three-point mounted engine having an axis which is transverse to the axis of the vehicle within which it is mounted. The mounting device comprises a highly resilient single leaf spring attached at one end to the engine and which has its other end held between two resilient cushioning blocks fixed to a chassis member of the vehicle.

This invention relates to a mounting device for the engine block of a vehicle.

In vehicles in which the engine block comprising the engine, the gear-box and the differential, is disposed transversely to the axis of the vehicle, it is known to mount the engine block on the chassis by means of two supporting feet disposed on the upper part of the engine block and by a transverse supporting member whose axis is parallel to the axis of the vehicle.

The transverse supporting member, which is constituted by a tie-rod secured respectively to the engine block housing and to the chassis, is intended to limit the oscillations of the engine block about its axis. However, such known engine mounting devices used rigid tie-rods which transmit the vibrations of the engine block to the vehicle body.

In order to eliminate this disadvantage, there is used in the device according to the invention, a resilient supporting member mounted on the chassis by means of elastic cushions which enable it to move longitudinally through a certain distance.

According to the present invention, the transverse supporting member of the engine block is constituted by a resilient leaf spring of which one end is fixed to the engine block housing and the other end is gripped between two cushioning blocks of elastic material by means of a stirrup member whose free ends are fixed to a part of the chassis.

Figure 1:
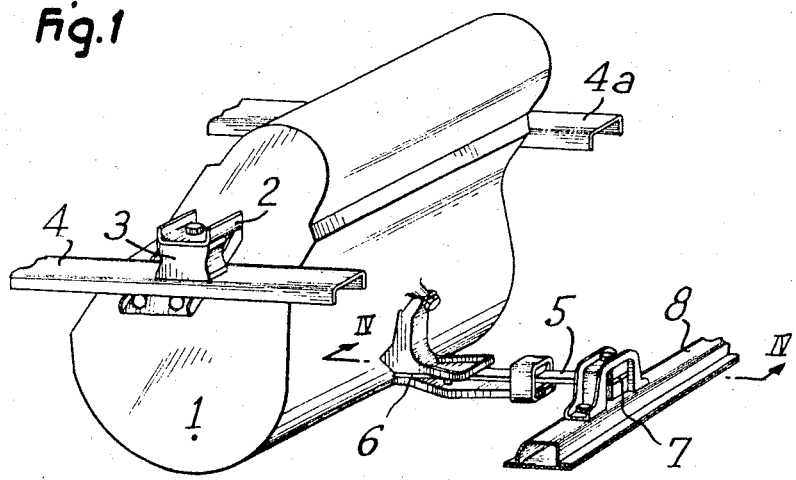
Figure 2:
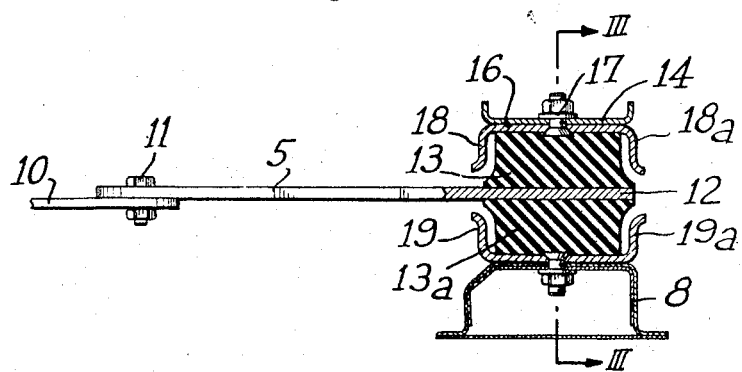
Figure 3:
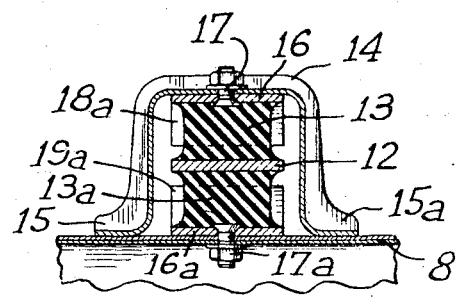
Figure 4:
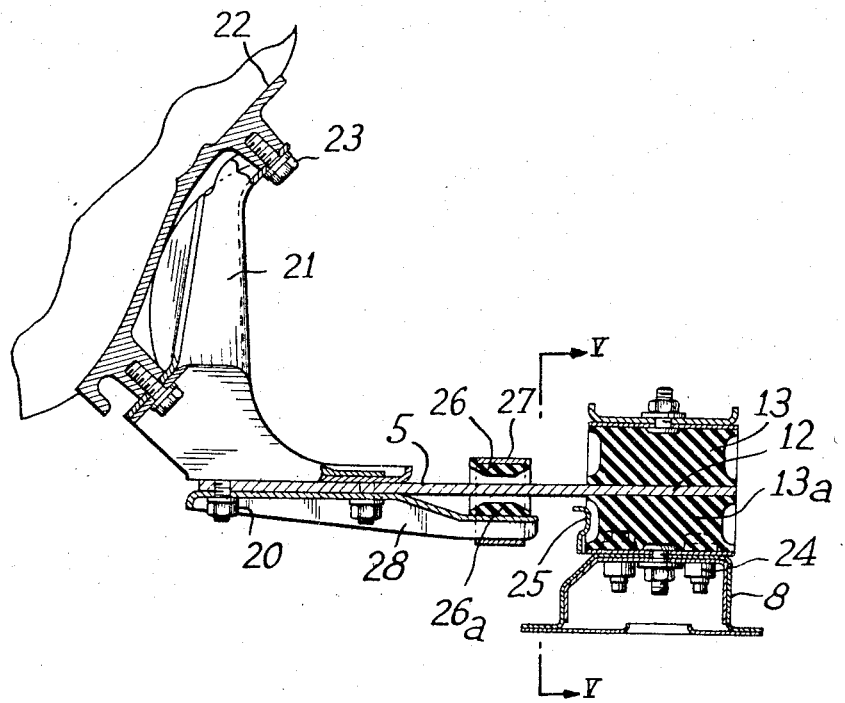
Figure 5:
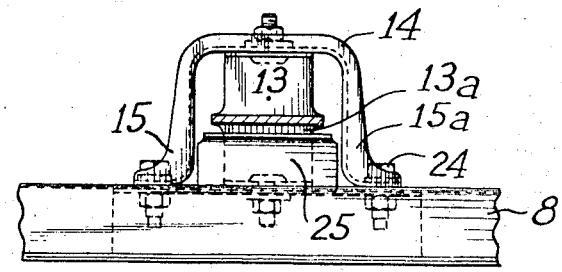

Other characteristics and advantages of the invention will appear from the following description of one embodiment given by way of example with reference to the accompanying drawings in which:

FIG. 1 is a perspective view of the mounting device of the invention assembled with an engine block in a vehicle, FIG. 2 is a part sectional elevation of a detail of the device showing the transverse mounting member of the engine block, FIG. 3 is a section along the line III–III of FIG. 2, FIG. 4 is a section along the line IV—IV of another embodiment of the transverse supporting member of the engine block, and FIG. 5 is a section along the line V—V of FIG. 4.

In FIG. 1 there is shown an engine block 1 comprising an engine, a clutch, a gear-box and a differential, the engine being disposed with its longitudinal axis located transversely of the axis of the vehicle.

To the upper part of the engine block are fixed two supporting feet 2, of which one is shown in FIG. 1 and which are fixed by means of resilient blocks 3 on chassis elements 4, 4a of the vehicle. These supports 2 are located substantially in the longitudinal plane of the vehicle at the two ends of the engine block.

In order to avoid transverse oscillations of the engine block, a transverse supporting member 5 is fixed at one of its ends 6 to the engine housing and at its other end 7 to an element 8 of the vehicle chassis. The transverse supporting member 5 represented in more detail in FIGS. 2 and 3 is constituted by a highly resilient leaf spring which is fixed at one end by means of a bolt 11 to a bracket 10 rigid with the casing of the engine block, and by its other end 12 between two resilient cushioning blocks 13, 13a by means of a stirrup member 14 fixed to the chassis member 8 by feet 15, 15a.

Between the stirrup member 14 and the resilient cushion 13 is fixed, by means of a bolt 17, a U-shaped element 16 having two abutment arms 18, 18a. In a similar manner, between the resilient cushioning member 13a and the chassis element 8 is symmetrically fixed by a bolt 17a a further U-shaped element 16a having two abutment arms 19, 19a.

The transverse oscillations of the engine block 1 are transmitted to the highly resilient leaf spring 5 and to the resilient cushioning members 13, 13a which are deformed and so damp said vibrations. The deformations of the elastic cushioning 13, 13a are limited respectively by the abutment arms 18, 18a and 19, 19a.

FIGS. 4 and 5 show another embodiment of the transverse supporting member which also comprises the resilient leaf spring 5 fixed at one of its ends by bolts 20 to a bracket 21 itself fixed to the engine block housing 22 by bolts 23. At its other end 12 the resilient leaf spring 5 is held in the same manner as previously described, i.e., by being gripped between two resilient cushioning blocks 13, 13a by means of a stirrup member 14 whose feet 15, 15a are fixed to the chassis element 8 by bolts 24. On one of the faces of the resilient cushioning block 13a is disposed, opposite the casing 22, an abutment 25 which is rigid with the chassis member 8.

In the median portion of the resilient leaf spring 5 are disposed respectively above and below the latter, at a predetermined distance, resilient abutment devices 26, 26a which are fixed to a stirrup member 27 rigid with an arm 28 fixed to the bracket 21 by bolts 20.

In this embodiment the deformations of the leaf spring 5 resulting from oscillations transmitted thereto by the engine block are limited by the abutment devices 26, 26a.

Of course, the invention is not limited to the embodiments described and shown, but covers all other modifications.

What I claim is:

1. A mounting device adapted to be used as a single transverse mounting device in a three-point mounted engine having an axis which is transverse to a vehicle in which it is mounted; said mounting device comprising: a resilient leaf spring having two ends; two resilient cushioning blocks; abutment means for limiting the displacement of said blocks; and a stirrup member; one of the ends of said leaf spring being adapted to be fixed to said engine and the other end being securely held between said two resilient cushioning blocks by means of the stirrup member which is adapted to be fixed to a member which is adapted to be fixed to a member of the vehicle's chassis.

2. The mounting device of claim 1 wherein said abutment means are formed by two U-shaped elements having abutment arms; one U-shaped element partially surrounding one of each of said cushioning means on opposite sides of said leaf spring.

3. The mounting device of claim 1 wherein said abutment means are formed by a stirrup member which surrounds said leaf spring in the median portion thereof; said stirrup member including an arm extending parallel to said leaf spring adapted to be fixed to said engine and resilient portions forming resilient stop means, mounted in said stirrup, above and below said leaf spring, to limit the movement of said spring.

References Cited

UNITED STATES PATENTS

| | | | |
|---|---|---|---|
| 2,329,829 | 9/1943 | Clayton | 248—7 |
| 3,191,710 | 6/1965 | Reynolds | 180—64 |
| 3,236,326 | 2/1966 | Reynolds | 180—64 |
| 3,326,501 | 6/1967 | Cauvin | 248—9 |

ROY D. FRAZIER, *Primary Examiner.*

J. FRANKLIN FOSS, *Assistant Examiner.*

U.S. Cl. X.R.

248—15, 21